April 20, 1965     J. A. HARRISON     3,179,574
PETRI DISHES
Filed Feb. 13, 1962
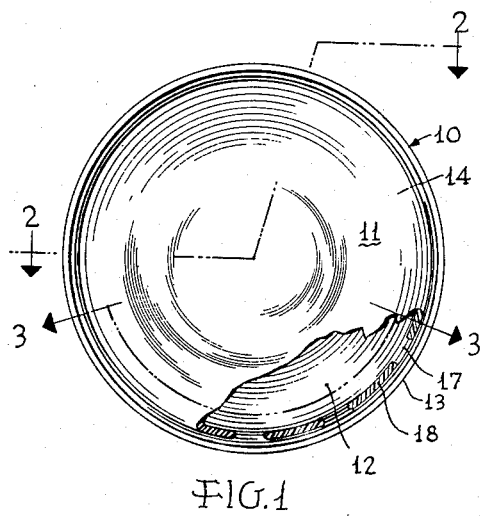
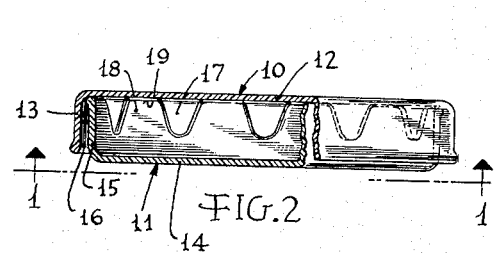
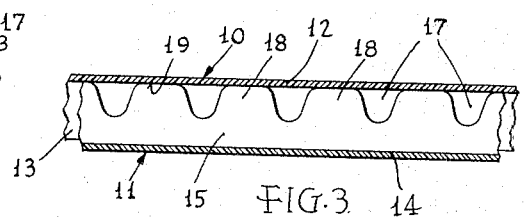
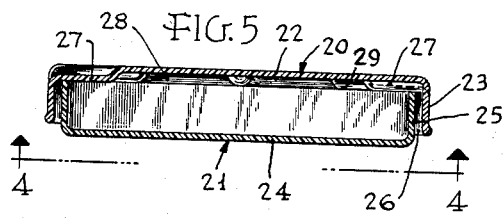
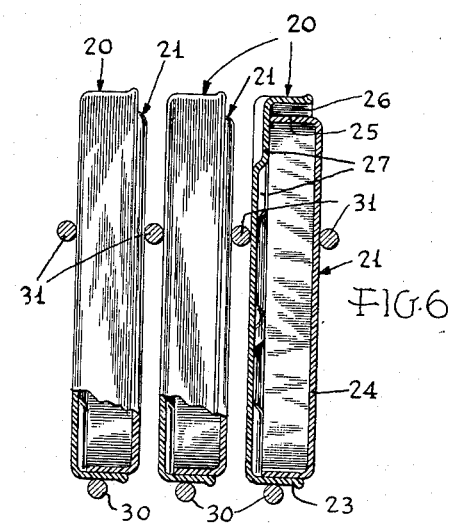
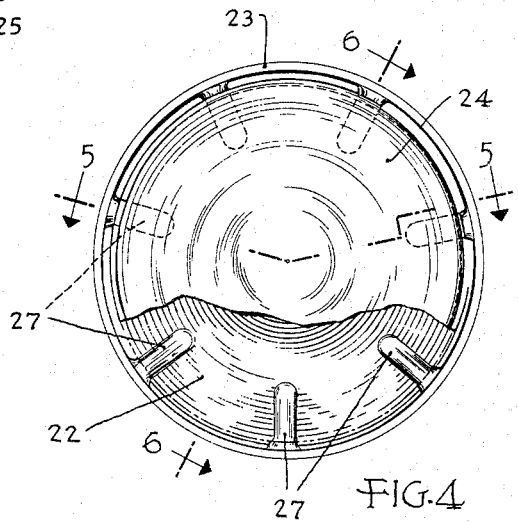
INVENTOR
James A. Harrison
BY Karl L. Schiff
AGENT 3,179,574
PETRI DISHES
James A. Harrison, 322 Wellesley Road,
Philadelphia 19, Pa.
Filed Feb. 13, 1962, Ser. No. 173,014
3 Claims. (Cl. 195—139)

This is a continuation-in-part of applicant's copending, now abandoned, original application Serial Number 827,217, filed July 15, 1959, for Method for Washing Petri Dishes.

The invention relates to shallow, mostly circular Petri dishes which consist of a flat base wall and a single upstanding, cylindrical, peripheral side wall, which are preferably made of glass, which are used in pairs with a slightly larger upper or top dish telescopingly covering a lower or bottom dish, and which serve for growing cultures of bacteria, fungi, etc. on a suitable stratum contained in the lower dish, or for other purposes.

While there are cheap disposable Petri dishes, mostly made of transparent plastic, the invention is particularly concerned with Petri dishes made of heat-resistant glass, such as marketed under the trademark Pyrex, which are too expensive to be thrown away after one single use. Petri dishes are mostly obtainable in a few standard sizes ranging in diameter from about 60 to 150 mm. and in height of 10 to 20 mm. The relative height of the bottom dish to the top dish is such that the top dish will rest on the upper margin of the bottom dish without reaching by its lower margin the supporting surface on which the bottom dish rests.

So as to prepare such Petri dishes for use or reuse, it is customary to separate the upper from the lower dish and then wash them in this separated condition, for instance in a dish washer. Such separation prior and during the washing procedure would seem unavoidable when used pairs of dishes have to be cleaned of the stratum, cultures, or the like held in the lower dish. The separation is not only cumbersome and time consuming but may involve additional hazards in regard to the undesirable or even dangerous, unwanted dissemination of cultures grown in the dishes and in regard of keeping the dishes sterile after the cleaning.

The invention overcomes this age-old notion and resides in a new form of such dishes, which is particularly suitable for washing Petri dishes by a new method in which the Petri dish assemblies, without being separated, are held upright during the washing procedure.

The advantages of the invention are self-evident from the above outlined characteristics of the hitherto employed procedure.

The communication between the inside and the outside of the two dishes of a pair of Petri dishes during the washing, rinsing and drying procedure is enhanced by a new formation of at least one of the dishes of a pair, by which open passages are established between the margin of the single peripheral, cylindrical side wall of the lower dish and the base wall of the upper dish. This condition is particularly achieved by the invention in that at least one of said margins of the single peripheral wall of the lower or inner dish and the peripheral portion of said base wall of the upper or outer dish is provided with at least three but preferably more alternating projections or recesses distributed or arranged so that each two succeeding projections are less than half the circumference or less than 180° apart from each other.

The aforesaid and further objects, advantages, and features of the invention will become apparent from the following description of several embodiments which are illustrated in the attached drawing.

In the drawing:

FIG. 1 is a bottom view of one embodiment of one pair of Petri dishes, certain parts of the lower dish being broken away and shown in section.

FIG. 2 is a section and side elevation along line 2—2 of FIG. 1.

FIG. 3 is a section and inside development along line 3—3 of FIG. 1.

FIG. 4 is a bottom view of another embodiment, the view being taken in the direction of the arrows 4—4 of FIG. 5.

FIG. 5 is a section along line 5—5 of FIG. 4, and

FIG. 6 is a diagrammatic, fragmentary section through the supporting rack of a washing machine with three pairs of dishes held thereby the dishes being partly or completely sectioned along line 6—6 of FIG. 4.

The embodiment of a pair of Petri dishes shown in FIGS. 1 to 3 comprises an upper dish 10 and a lower dish 11. The upper dish 10 has a flat base wall 12 and a single cylindrical, peripheral side wall 13. The lower dish 11 has a flat base wall 14 and a single cylindrical, peripheral side wall 15, the outer diameter of lower dish 11 being slightly smaller than the inner diameter of upper dish 10 so that the two dishes telescope as illustrated in leaving a narrow gap 16 between their cylindrical side walls 13 and 15, respectively.

The peripheral wall 15 of lower dish 11 is provided with projections 18 leaving between them recesses 17 so that the base wall 12 of the upper dish 10 rests on the edge or margin 19 presented by the projecting portions 18 of peripheral wall 15. Although the embodiment shows a great number of about equally wide projections and recesses which are equally spaced from each other over the entire circumference of margin 19, it will easily be seen that there have to be more than two, that is at least three projecting portions and that these have to be spaced, preferably about equal distances, less than half the circumference of the dish or less than 180° from each other so as to give full support to the base wall of the upper dish. The width of the projections should be small and their height be sufficient so as to leave relatively large passages between them. The drawing illustrates acceptable proportions between the width and the height of the projections relative to the dimensions of the Petri dishes, which dimensions were outlined hereinbefore.

The recesses 17 and the gap 16 between the peripheral walls 15, 16 of the two dishes provide for communication between the interior of dish 11 and the outside, which is used for washing and cleaning the dishes without separating them, as is illustrated by and will be explained in connection with the embodiment shown in FIGS. 4 to 6.

The embodiment shown in FIGS. 4 to 6 comprises likewise an upper dish 20 and a lower dish 21. Upper dish 20 has a base wall 22 and a single cylindrical, peripheral wall 23 and the lower dish 21 has a base wall 24 and a single cylindrical, peripheral wall 25, the diameters of the two single cylindrical, peripheral walls 23, 25 being again so that the two dishes telescopingly fit into each other while leaving a narrow gap 26 between their peripheral walls 23, 25.

The marginal portion of the base wall 22 of upper dish 20, that is the portion at or along peripheral side wall 23, is provided with projections 27, which extend radially toward the center of the dish and project from the base wall 22 in the same direction as the peripheral wall 23. These projections are, as visible from the drawing, formed by bends or waves of the base wall 22 without causing any change in the wall thickness of the latter. Upper dish 20 rests through these projections 27 on the upper marginal edge 29 of lower dish 21, the projections 27 leaving between them openings 28 through which the interior of lower dish 21 communicates with the outside. Here again there have to be at least three projections 27 and they have to be distributed as explained hereinbefore in connection with the projections 18 of the first embodiment.

For the purpose of washing, the dishes are supported, as shown in FIG. 6, by bars 30 of a wash rack, are held in upright position between bars 31 of the rack, and are placed in this position with the rack into a washing machine (not shown). The bars 31 may be spaced apart sufficiently so as to allow interruption of the contact between the upper margin 29 of lower dish 21 from the base wall 22 of upper dish 20 while preventing the dishes of each pair or assembly from actually separating from each other.

It will be noted that the single cylindrical, peripheral walls of each pair of dishes make contact at the bottom while providing a correspondingly wider gap 26 at the top, when they are held by the bars 30, 31, as shown in FIG. 6, during the washing process. This contributes to the desired communication between the interior of the dishes and the outside and improves the circulation of cleaning liquid, rinse, and drying air during the entire cleaning cycle.

After completion of the washing and drying, the dishes 20, 21 are removed from rack 31, 32 and need not be taken apart until they are actually again to be used. This contributes to keeping the dishes clean and sterile between the washing operation and their actual re-use.

The invention is not restricted to the details of the illustrated embodiment but is susceptible to modifications and adaptations, particularly in regard to the arrangement, form, and number of the projections or recesses which contribute to the establishment of communication between the interior and the exterior.

What is claimed is:

1. Petri dish pair consisting of a bottom dish and a top dish, each dish having a base wall and a single peripheral side wall, the outer diameter of said bottom dish being slightly smaller than the inner diameter of said top dish, the top dish with its single peripheral side wall telescopingly fitting over the single peripheral side wall of said bottom dish in leaving a radially narrow gap between said two peripheral walls, said top dish engaging by its base wall the edge of the peripheral side wall of the bottom dish, one only of said edge of said peripheral side wall of the bottom dish and said flat base wall of the top dish being provided with at least three alternating projections and recesses, the spaces between said projections being less than half the circumference of the peripheral side wall, said projections engaging the other one of said flat base wall and said edge thereby establishing means of communication between the interior of the dishes and the outside.

2. Petri dish bottom having a single upstanding cylindrical, peripheral side wall and a base wall and being designed for use with a Petri dish top telescopingly fitting with a radially narrow gap over and resting by its said base wall on the edge of said peripheral wall, said edge being formed with more than two alternating projections and recesses spaced from each other in both circumferential directions less than half the circumference of said edge so as to provide open passages between the interior and exterior of assembled dishes.

3. Petri dish top consisting of a flat base wall and a single cylindrical, peripheral side wall, said base wall being formed with radially arranged, circumferentially narrow, waved portions emanating from its peripheral side wall and extending a short distance only toward the center of the dish thereby providing projections in the interior of the dish, said waved portions being spaced from each other in both circumferential directions less than half the circumference of the dish.

References Cited by the Examiner
UNITED STATES PATENTS

| | | | |
|---|---|---|---|
| 2,144,255 | 1/39 | Carpenter | 195—139 |
| 2,533,089 | 12/50 | Brewer et al. | 195—139 |
| 2,798,012 | 7/57 | Fouquet | 134—34 |
| 2,930,721 | 3/60 | Tuthill | 134—25 |
| 2,971,892 | 2/61 | Carski. | |

A. LOUIS MONACELL, *Primary Examiner.*

ABRAHAM H. WINKELSTEIN, *Examiner.*